United States Patent
Mazloum et al.

(10) Patent No.: US 11,838,160 B2
(45) Date of Patent: Dec. 5, 2023

(54) GENERATION OF AN OFDM-BASED SINGLE CARRIER WAKE-UP SIGNAL

(71) Applicant: Sony Corporation, Tokyo (JP)

(72) Inventors: Nafiseh Mazloum, Lund (SE); Ove Edfors, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 16 days.

(21) Appl. No.: 17/059,923

(22) PCT Filed: Jun. 3, 2019

(86) PCT No.: PCT/EP2019/064282
§ 371 (c)(1),
(2) Date: Nov. 30, 2020

(87) PCT Pub. No.: WO2019/229266
PCT Pub. Date: Dec. 5, 2019

(65) Prior Publication Data
US 2022/0021494 A1  Jan. 20, 2022

(30) Foreign Application Priority Data
Jun. 1, 2018 (SE) .................................... 1830179-6

(51) Int. Cl.
*H04L 27/26* (2006.01)
*H04L 5/00* (2006.01)
*H04W 52/02* (2009.01)

(52) U.S. Cl.
CPC .......... *H04L 27/261* (2013.01); *H04L 5/0048* (2013.01); *H04L 27/2634* (2013.01); *H04W 52/0235* (2013.01)

(58) Field of Classification Search
CPC . H04L 27/261; H04L 27/2634; H04L 5/0048; H04L 5/0053; H04W 52/0216; H04W 52/0235; Y02D 30/70
See application file for complete search history.

(56) References Cited

U.S. PATENT DOCUMENTS 9,525,540 B1  12/2016  Shellhammer
2006/0039270 A1* 2/2006 Strohmer .......... H04L 27/26035
370/203
(Continued)

FOREIGN PATENT DOCUMENTS

WO  2018017005 A1  1/2018
WO  2018017008 A1  1/2018
(Continued)

OTHER PUBLICATIONS

Xiaofei Wang (Interdigital): ("On the Coexistence of 802.11ax and 802.11ba Signals"; IEE Draft; IEE-SA Mentor, Piscataway, NJ USA, vol. 802.11ba, No. 3 May 11, 2017 (May 11, 2017), pp. 1-21, XP068115849 (Year: 2017).*
(Continued)

Primary Examiner — Melvin C Marcelo
Assistant Examiner — Natali Pascual Peguero
(74) Attorney, Agent, or Firm — TUCKER ELLIS LLP

(57) ABSTRACT

Orthogonal Frequency Division Multiplex and Non-Coherent Demodulation A method includes obtaining a reference signal waveform which is defined in accordance with a non-coherent modulation scheme. The method also includes shaping the reference signal waveform to obtain at least one signal waveform associated with one or more subcarriers of a plurality of subcarriers. The method also includes inputting the at least one signal waveform to at least one corresponding channel of a multi-channel orthogonal frequency division multiplex, OFDM, modulator. The method further includes transmitting an OFDM symbol output by the OFDM modulator. Said shaping approximates a baseband representation of a part of the OFDM symbol associated with the one or more subcarriers to the reference signal waveform. For example, the reference signal waveform can be a reference wake-up signal waveform.

13 Claims, 9 Drawing Sheets

(56) References Cited

U.S. PATENT DOCUMENTS

| | | | |
|---|---|---|---|
| 2008/0089443 A1* | 4/2008 | Sanada | H04L 27/2675 375/319 |
| 2010/0002575 A1* | 1/2010 | Eichinger | H04L 27/2636 370/329 |
| 2013/0121392 A1* | 5/2013 | Thompson | H04L 25/03057 375/232 |
| 2018/0103431 A1 | 4/2018 | Suh | |
| 2020/0052945 A1* | 2/2020 | Kant | H04L 27/2623 |
| 2020/0059342 A1* | 2/2020 | Sahin | H04W 52/0235 |
| 2020/0137770 A1* | 4/2020 | Chitrakar | H04W 52/0229 |

FOREIGN PATENT DOCUMENTS

| | | |
|---|---|---|
| WO | WO-2018017008 A1 | 1/2018 |
| WO | 2018204246 A1 | 11/2018 |

OTHER PUBLICATIONS

International Search Report and Written Opinion from corresponding International Application No. PCT/EP2019/064282, dated Aug. 19, 2019, 12 pages.

Office Action with Swedish Search Report for corresponding Swedish Application No. 1830179-6, dated Jan. 18, 2019, 8 pages.

Sahin, Alphan et al., "On the Coexistence of 802.11ax and 802.11ba Signals"; IEEE802.11-17/0659r3, May 8, 2017, 21 pages (Author identified as Xiaofei Wang in ISRWO).

Alpman, Erkan et al., "95uW 802.11g/n compliant fully integrated wake-up receiver with -72dBm sensitivity in 14nm FinFET CMOS"; RM03A-2, IEEE Radio Frequency Integrated Circuits Symposium, dated Jun. 4, 2017, pp. 172-175.

Wei, Ning et al., "Packete Design for Wake-up Receiver (WUR)"; IEEE 802.11-17/0066r0, Jan. 10, 2017, 9 pages.

* cited by examiner

GENERATION OF AN OFDM-BASED SINGLE CARRIER WAKE-UP SIGNAL

TECHNICAL FIELD

Various techniques are related to Orthogonal Frequency Division Multiplex Modulation and non-coherent decoding of respective signals.

BACKGROUND

Wireless communication employs battery-powered devices (hereinafter, terminals) that can connect to an access node to transmit and/or receive data. To reduce energy consumption, low-power modes are sometimes employed. When the terminal is operated in such a low-power mode, an associated access node transmits an appropriate signal to prepare the terminal for subsequent communication of data (a process sometimes referred to as paging).

There are various paging signals known that are employed in connection with paging. A new concept of paging signals, the so-called wake-up signal (WUS), has been introduced in the Third Generation Partnership (3GPP) to Machine Type Communication (MTC) and Narrowband Internet of Things (NB-IoT) protocols. The objective of the WUS is to reduce the total energy cost in the UE for listening for paging. The WUS is expected to be sent prior to further paging signals, such as a paging indicator on a physical data control channel. Examples of physical data control channels include Physical Downlink Control Channel (PDDCH) or MTC PDDCH (MPDCCH) or NB-IoT PDCCH (NPDCCH). The terminal may selectively decode the physical data control channel and the subsequent data shared channel—such as the Physical Data Shared Channel (PDSCH)—for a further paging signal, the paging message, upon detecting the WUS.

Example implementations of WUSs are described in 3GPP TSG RAN Meeting #74 contribution RP-162286 "Motivation for New WI on Even further enhanced MTC for LTE"; 3GPP TSG RAN Meeting #74 contribution RP-162126 "Enhancements for Rel-15 eMTC/NB-IoT"; and 3GPP TSG RAN WG1 #88 R1-1703139 "Wake Up Radio for NR". See 3GPP TSG RAN WG2 #99 R2-1708285.

SUMMARY

A need exists for advanced techniques of wireless communication.

This need is met by the features of the independent claims. The features of the dependent claims define embodiments.

A method includes obtaining a reference signal waveform which is defined in accordance with a modulation scheme. The method also includes shaping the reference signal waveform by calculation. By means of the calculation, at least one signal waveform is obtained. The at least one signal waveform is associated with one or more subcarriers of a plurality of subcarriers. The method also includes inputting the at least one signal waveform to at least one corresponding channel of a multi-channel orthogonal frequency division multiplex, OFDM, modulator, in response to said shaping. The method further includes transmitting an OFDM symbol output by the OFDM modulator. Said shaping approximates a baseband representation of a part of the OFDM symbol associated with the one or more subcarriers to the reference signal waveform.

The method may be executed by a wireless interface of a base station.

A device is configured to obtain a reference signal waveform which is defined in accordance with a modulation scheme. The device is further configured to shape the reference signal waveform by calculation, to obtain at least one signal waveform associated with one or more subcarriers of a plurality of subcarriers. The device is further configured to input the at least one signal waveform to at least one corresponding channel of a multi-channel orthogonal frequency division multiplex, OFDM, modulator, in response to said shaping. The device is further configured to transmit an OFDM symbol output by the OFDM modulator. The shaping approximates a baseband representation of a part of the OFDM symbol associated with the one or more subcarriers to the reference signal waveform.

For example, the device may be a UE, an access point, a base station, etc.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

DETAILED DESCRIPTION OF EMBODIMENTS

Figure 1:
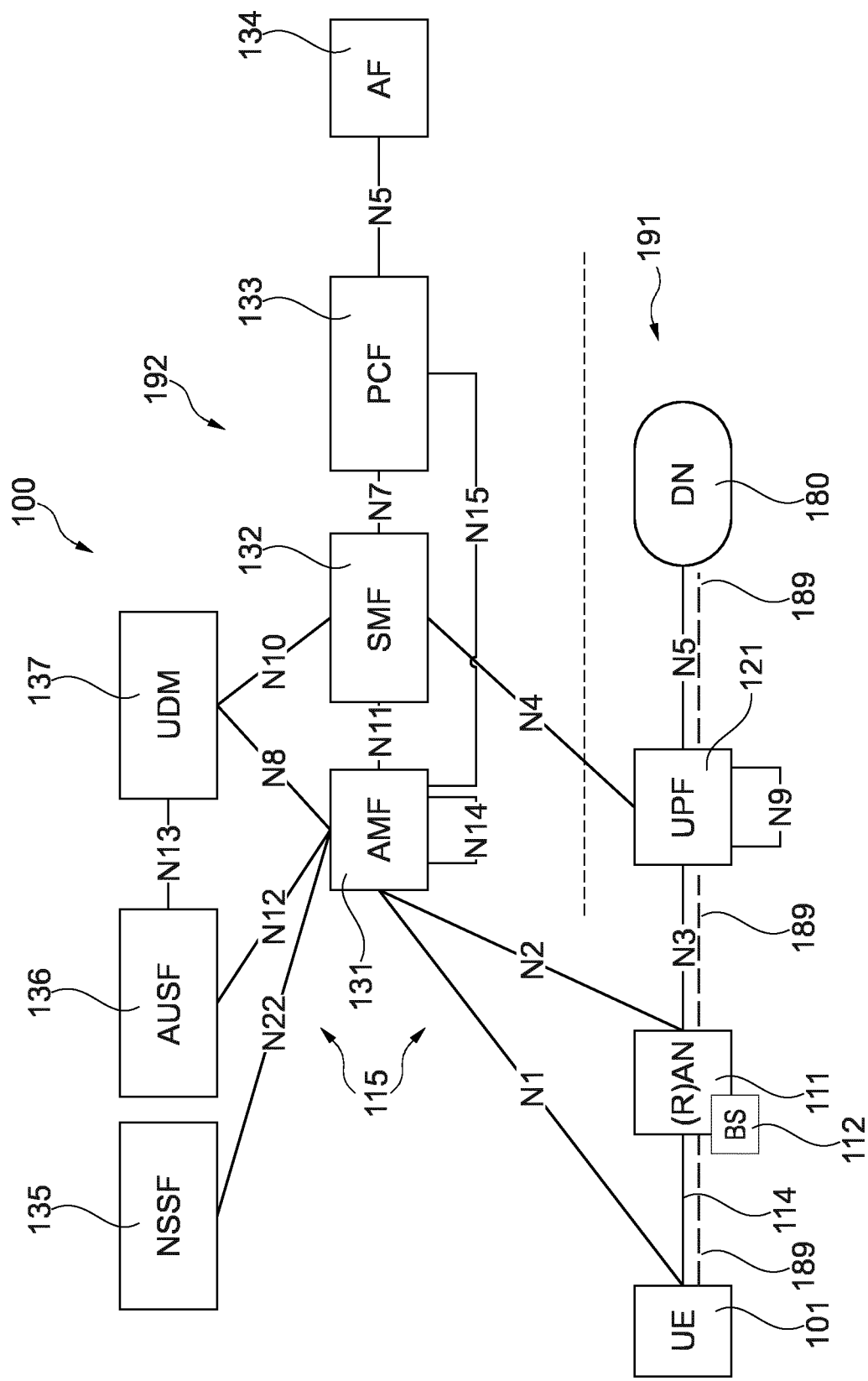
FIG. 1 schematically illustrates a cellular network relying on paging of a terminal according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wirelessly transmitting and/or receiving (communicating) are described. In the various examples described herein, various communication systems may be used. For example, a communication network may be employed. The communication network may be a wireless network. For sake of simplicity, various scenarios are described hereinafter with respect to an implementation of the communication network by a cellular network. The cellular network includes multiple cells. Each cell corresponds to a respective sub-area of the overall coverage area. Other example implementations include a multi-area wireless network such as a cellular WiFi network, etc.

Specifically, various examples are described in which a base station (BS) of a cellular network transmits a signal. However, as a general rule, the techniques described herein can be readily applied to other kinds and types of transmitting devices. For example, a UE may transmit a signal, e.g., in peer-to-peer communication.

In the various examples described herein, various kinds and types of signals may be communicated. An example of a signal that may be communicated is a WUS. While reference is primarily made to communicating WUS hereinafter, in other examples, other kinds and types of signals may be communication. The respective techniques described for communicating WUS can be readily applied for communicating other kinds and types of signals.

Hereinafter, techniques of paging a terminal is described. For this, paging signals can be transmitted to the terminal. Paging signals may include a WUS, a paging indicator, and/or a paging message.

Hereinafter, WUS techniques are described. The WUS techniques enable a terminal to transition a main receiver into a low-power state, e.g., for power-saving purposes. In some examples, the low-power state of the main receiver may be an inactive state.

The inactive state can be characterized by a significantly reduced power consumption if compared to an active state of the main receiver. For example, the main receiver may be unfit to receive any data in the inactive state such that some or all components may be shut down. Wakeup of the main receiver from the inactive state is then triggered by a WUS. The inactive state can be associated with various operational modes of the terminal, e.g., a disconnected mode or idle mode. Here, a data connection between the terminal and the cellular network can be released.

For example, the WUS may be received by a low-power receiver of the terminal. The low-power receiver may be configured to perform time-domain processing to receive the WUS. The low-power receiver may be unfit to perform Orthogonal Frequency Division Multiplex, OFDM demodulation. For example, the low-power receiver may be configured to perform non-coherent decoding. For non-coherent decoding, knowledge of a reference phase is not required for signal detection.

The low-power receiver and main receiver may be implemented within the same hardware component(s) or may be implemented by at least one different hardware component.

The WUS may help to avoid blind decoding of a control channel on which paging signals and/or paging messages are communicated. Since typically such blind decoding is comparably energy inefficient, power consumption can be reduced by using WUSs. This is explained in greater detail hereinafter: For example, in reference implementations without WUS transmission, during paging occasions (POs), the terminal is expected to blind decode the control channels MPDCCH (for Machine Type Communication) or PDCCH (for LTE) or NPDCCH (for NB-IOT) for P-RNTI as paging identity. If presence of a paging indicator including the P-RNTI is detected, the terminal continues to decode a subsequent PDSCH for a paging message. However, the paging message on PDSCH may be indicative of paging of other UEs, and not for the given terminal. In this case, the given terminal needs to go back to sleep until the next PO. Moreover, in applications where the paging rate is very low, the cost of terminal idle listening can become relatively high. Under this condition, the terminal needs to monitor the control channel without receiving any paging indication and/or a false paging indication for another terminal. In MTC, it could be even worse as the respective MPDCCH control channel is transmitted with the highest number of repetitions which reflect the maximum extended coverage used in that cell. Using the WUS helps to avoid blind decoding of the physical control channel.

Communication of the WUS may be time-aligned with a discontinuous reception (DRX) cycle of the terminal. A DRX cycle includes ON-durations and OFF-durations. The low-power receiver can be selectively activated during the ON-durations.

Sometimes, the operational mode of the terminal associated with WUS communication is referred to as WUS mode. As a general rule, there may be multiple WUS modes available, e.g., modes in which the terminal is registered at the network as connected or idle, etc. A data connection may or may not be established between the terminal and the network when receiving a WUS.

Various concepts have been described to facilitate communication of a WUS. In some reference implementations, the WUS is designed based on OFDM modulation principles to allow its orthogonality to other signals transmitted in the same OFDM symbol. In such reference implementations, this OFDM-modulated WUS, however, needs to be received by the same power-hungry fast Fourier transform (FFT) based or multi-carrier-based receiver used to decode the PDCCH or PDSCH. In detail, to be able to detect and decode the WUS with such a design, the terminal needs to first decode a costly synchronization signal (SS) or it needs to stay synchronized with the network by keeping some certain parts of its circuit on, i.e., its channel estimator. Both, the use of a power-hungry receiver as well as the decoding of costly SS, reduce the resulting energy saving from the WUS. For example, where OFDM demodulation is used to receive the WUS, it has been found that the resulting energy saving is very limited in scenarios where there is a tight requirement on reachability of the terminal and the terminal is configured with DRX cycles. It has been found that using WUS only helps to significantly reduce the energy consumption, in certain scenarios where the terminal is in the extended coverage or is configured with extended DRX cycles that have longer OFF-durations.

Hereinafter, techniques are described which facilitate reduction the power consumption using a WUS if compared to such reference implementations.

Specifically, techniques are described which facilitate reducing the power consumption for various scenarios, e.g., not only for extended coverage and extended DRX cycles.

According to examples, this is achieved by an OFDM-based, single carrier WUS that can be decoded by a low-power receiver. The WUS can be both orthogonal to the rest of the OFDM symbol and can be received by a non-coherent low-power receiver that does not require tight synchronization. No costly synchronization signal is needed for the WUS detection and therefore the WUS design can lead to an extensive energy saving specially for scenarios where there is a tight requirement on reachability of the terminal, i.e., the terminal is configured with DRX cycles having short OFF-durations.

According to examples, such and further effects may be achieved by implementing a particular transmitter-side strategy for generating the WUS.

For example, a reference WUS waveform may be obtained. The reference WUS waveform may be defined in accordance with a non-coherent modulation scheme, e.g., on-off keying (OOK), or another modulation scheme that facilitates operation of a low-power receiver. A corresponding mapping of the non-coherent modulation scheme may be applied to obtain the reference WUS waveform. The WUS waveform may be defined in the baseband, and later modulated onto a carrier or a set of OFDM subcarriers. For example, the reference WUS waveform may be obtained in a transmit buffer, e.g., at an upper edge of a physical layer. For example, the reference WUS waveform may be obtained in response to a wake-up event or, generally, a paging event.

Then, the reference WUS waveform may be shaped. A corresponding shaping block can output at least one WUS waveform. More specifically, the at least one WUS waveform can correspond to a frequency-domain representation of the reference WUS waveform.

The shaping may thus correspond to functionality implemented on the physical layer.

The shaping block can prepare the reference WUS waveform for OFDM modulation. For example, each WUS waveform of the at least one WUS waveform output by the shaping block may be associated with a respective subcarrier of a plurality of subcarriers (WUS subcarriers).

The shaping block can include a calculation. I.e., a direct analytical calculation or an iterative optimization can be used. This is different to reference techniques—e.g., as described in Sahin A. et al., "On the Coexistence of 802.11ax and 802.11ba Signals" (2017). By using a shaping block, it is possible to calculate a new input for each OFDM symbol. This enables to change the reference WUS waveform arbitrarily between consecutive OFDM symbols, not just selecting it from the same pre-defined set. In scenarios in which a predefined look-up table is used, the set of possible signals is limited and does not change. This strongly limits the ability to accommodate for various arbitrarily shaped reference WUS waveforms or reference WUS waveforms having an arbitrary timing with respect to the timing of OFDM symbols. For example, if the start time of the reference WUS waveform varies if compared to the start time of the OFDM symbol, this means that different pre-defined entries in a look-up table are required according to reference implementations; this can make it practically impossible to use a variable timing for the reference WUS waveform. This can result in a complex and/or energy-inefficient interoperability with the low-power receiver. Differently, if a calculation is used for the shaping as described herein, then a flexible start time of the reference WUS waveform can be supported. Also, variable reference WUS waveforms may be selected.

Then, the at least one WUS waveform is input to an OFDM modulator. For example, the OFDM modulator can operated based on an inverse FFT (IFFT). The OFDM modulator outputs an OFDM symbol.

Then, the OFDM symbol can be transmitted. For example, a transmitter is controlled to transmit the OFDM symbol.

The shaping approximates a baseband representation of a part of the OFDM symbol correspond to the WUS subcarriers (WUS part of OFDM symbol) to the reference WUS waveform. Thereby, a low-power receiver can receive the WUS part of the OFDM symbol.

FIG. 1 schematically illustrates a cellular network 100. The example of FIG. 1 illustrates the network 100 according to the 3GPP 5G architecture. Details of the fundamental architecture are described in 3GPP TS 23.501, version 1.3.0 (2017-09). While FIG. 1 and further parts of the following description illustrate techniques in the 3GPP 5G framework, similar techniques may be readily applied to different communication protocols. Examples include 3GPP LTE 4G and IEEE Wi-Fi technology.

In the scenario of FIG. 1, a terminal 101 is connectable to the network 100. For example, the terminal 101 may be one of the following: a cellular phone; a smart phone; and IOT device; a MTC device; an NB-10T device; a sensor; an actuator; etc.

The terminal 101 is connectable to the network 100 via a radio access network (RAN) 111, typically formed by one or more base stations (BSs) 112. A wireless link 114 is established between the RAN 111—specifically between one or more of the BSs 112 of the RAN 111—and the terminal 101.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the terminal 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; NAS termination; connection management; reachability management; mobility management; access authentication; and access authorization. For example, the AMF 131 controls CN-initiated paging of the UEs 101. The AMF 131 may keep track of the timing of a DRX cycle of the terminal 101. The AMF 131 may trigger transmission of paging signals such as WUSs and/or paging indicators to the terminal 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving terminal.

FIG. 1 also illustrates aspects with respect to a data connection 189. The data connection 189 is established between the terminal 101 via the RAN 111 and the DP 191 of the CN 115 and towards the DN 180. For example, a connection with the Internet or another packet data network can be established. To establish the data connection 189, it is possible that the respective terminal 101 performs a random access (RACH) procedure, e.g., in response to reception of a paging signal, e.g., a WUS and a paging indicator. A server of the DN 180 may host a service for which payload data is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2.

Figure 2:
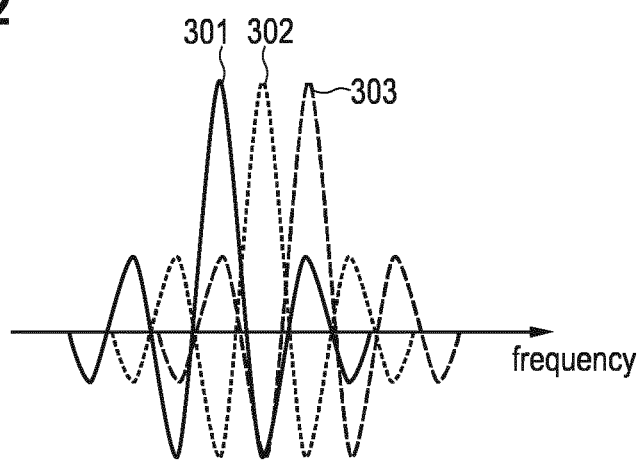
FIG. 2 schematically illustrates subcarriers of an orthogonal frequency division multiplex (OFDM) scheme and further schematically illustrates on-off-keying according to various examples.
Figure 2:
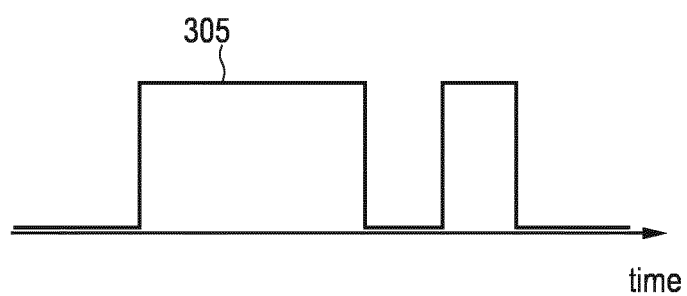

FIG. 2 illustrates aspects with respect to communicating on the wireless link 114. Specifically, FIG. 2 illustrates aspects with respect to modulation of signals to communicate on the wireless link 114.

Specifically, FIG. 2, upper part, illustrates multiple subcarriers 301-303 in frequency domain used for OFDM modulation. Different subcarriers 301-303 are orthogonal with respect to each other and thus can each encode specific information with reduced interference. As a general rule, OFDM modulation may employ a variable count of subcarriers 301-303, e.g., between 20 and 2000 subcarriers.

FIG. 2, lower part, illustrates a signal waveform 305 that is defined in accordance with an OOK modulation. To demodulate data encoded by a carrier or subcarrier 305 using OOK, non-coherent decoding may be employed. The transmitter and receiver may require less precise synchronization in frequency and time.

Various techniques are based on the finding that, in a low-power receiver, simple non-coherent modulation schemes, such as OOK, FSK, are often used for the signal transmission, since it allows low-power low-complex front-end architecture. Hereinafter, techniques are described which facilitate providing orthogonality, while still facilitating a low-power receiver to operated non-coherently, e.g., based on OOK. Frequency duplexing is facilitated between WUS and other signals. Further details with respect to frequency duplexing are illustrated in FIG. 3.

Figure 3:
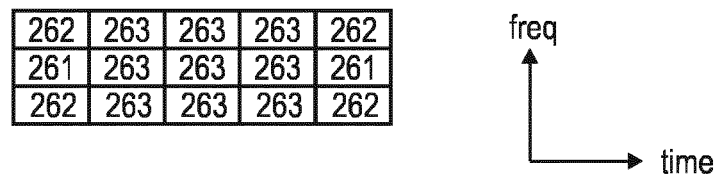
FIG. 3 schematically illustrates multiple channels and allocated resource elements in an OFDM resource grid according to various examples.

FIG. 3 illustrates aspects with respect to frequency division duplexing (FDD). FIG. 3 illustrates aspects with respect to physical channels 261-263 implemented on the wireless link 114. The wireless link 114 implements a plurality of communication channels 261-263. Transmission frames—e.g., implemented by radio frames, each including one or more subframes—of the channels 261-263 occupy a certain time duration.

Each channel 261-263 includes a plurality of time-frequency resource elements which are defined in time domain and frequency domain. For example, the resource elements may be defined in time domain with respect to the duration of an OFDM symbol. For example, the resource elements may be defined in frequency domain with respect to OFDM subcarriers. More generally, the resource elements may be defined in a time-frequency resource grid.

For example, a first channel 261 may carry WUSs. The WUSs enable the network 100—e.g., the AMF 131—to wake up the terminal 101. The WUSs may thus be communicated in dedicated resource elements of the channel 261.

A second channel 262 may carry paging indicators which enable the network 100. The paging indicators may thus be communicated in dedicated resource elements of the channel 262. Typically, the paging indicators are communicated on PDCCH.

As will be appreciated from the above, the WUSs and the paging signals may be different from each other in that they are transmitted on different channels 261, 262. Different resource elements may be allocated to the different channels 261-263. For example, in many scenarios the WUS and the paging indicators are transmitted at two different time instances.

Further, a third channel 263 is associated with user data and may hence carry higher-layer user-plane data packets associated with a given service implemented by the terminal 101 and the BS 112. Alternatively, control messages may be transmitted via the channel 263, e.g., a paging message or other RRC control data.

Figure 4:
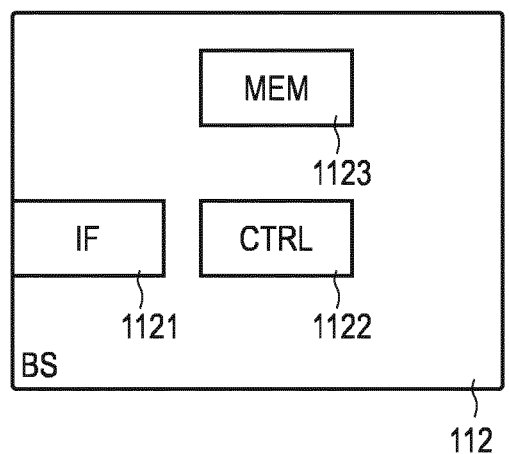
FIG. 4 schematically illustrates a base station according to various examples.

FIG. 4 schematically illustrates the BS 112. The BS 112 includes an interface 1121. For example, the interface 1121 may include an analog front end and a digital front end. The interface may include an OFDM modulator. The interface 1121 may be coupled to one or more antennas or antenna arrays. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the BS 112, e.g.: transmitting an OFDM symbol including a WUS; generating a WUS waveform; signal shaping a reference WUS waveform; performing a calculation to implement the signal shaping; etc.

Figure 5:
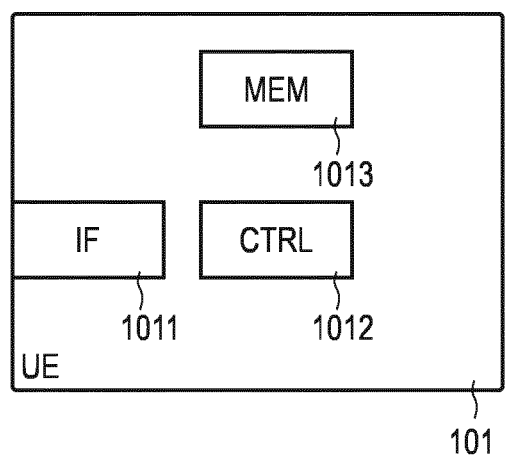
FIG. 5 schematically illustrates a terminal according to various examples.

FIG. 5 schematically illustrates the terminal 101. The terminal 101 includes an interface 1011. For example, the interface 1011 may include an analog front end and a digital front end. The interface 1011 may be coupled to an antenna. In some examples, the interface 1011 may include a main receiver and a low-power receiver. Each one of the main receiver and the low-power receiver may include an analog front end and a digital front end, respectively. The main receiver may include an OFDM demodulator. The low-power receiver may be configured for non-coherent time-domain decoding, e.g., according to OOK. The terminal 101 further includes a control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the terminal 101, e.g.: receiving a WUS; receiving a paging indicator and a paging message; operating the low-power receiver and the main receiver; etc.

Figure 6:
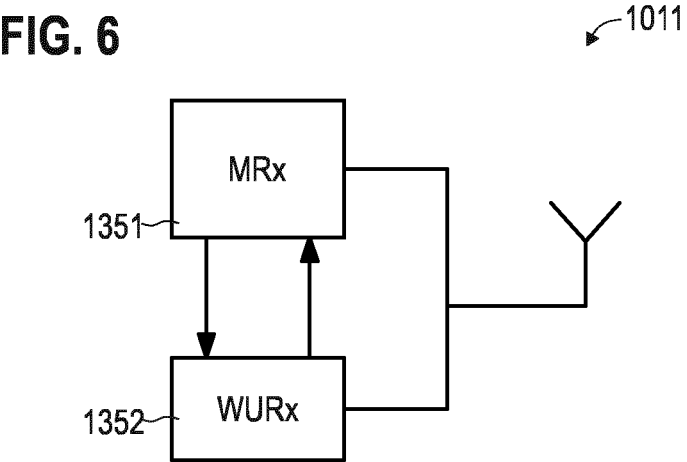
FIG. 6 schematically illustrates a main receiver and a low-power receiver according to various examples.

FIG. 6 illustrates details with respect to the interface 1011 of the terminal 101. In particular, FIG. 6 illustrates aspects with respect to a main receiver 1351 and a low-power receiver 1352. In FIG. 6, the main receiver 1351 and the low-power receiver 1352 are implemented as separate entities. For example, they may be implemented on different chips. For example, they may be implemented in different housings. For example, they may not share a common power supply.

The scenario FIG. 6 may enable switching off some or all components of the main receiver 1351 when operating the main receiver in inactive state. In the various examples described herein, it may then be possible to receive WUSs using the low-power receiver 1352. Also, the low-power receiver 1352 may be switched between an inactive state and an active state, e.g., according to a DRX cycle.

For example, if the main receiver 1351 is switched on, the low-power receiver 1352 may be switched off, and vice-versa. As such, the main receiver 1351 and the low-power receiver 1352 may be inter-related in operation (indicated by the arrows in FIG. 6).

Figure 7:
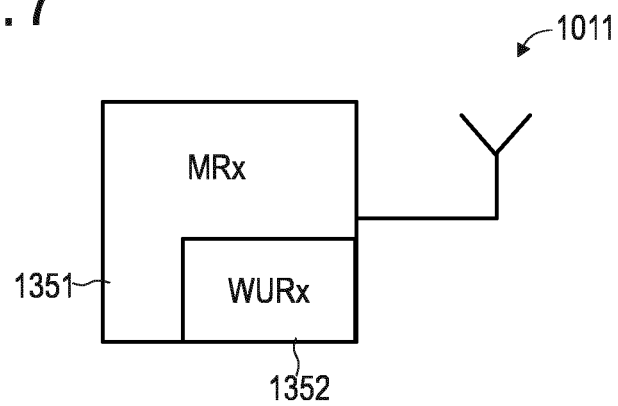
FIG. 7 schematically illustrates a main receiver and a low-power receiver according to various examples.

FIG. 7 illustrates details with respect to the interface 1011 of the terminal 101. In particular, FIG. 7 illustrates aspects with respect to the main receiver 1351 and the low-power receiver 1352. In FIG. 7, the main receiver 1351 and the low-power receiver 1352 are implemented as a common entity. For example, they may be implemented on the common chip, i.e., integrated on a common die. For example, they may be implemented in a common housing. For example, they may share a common power supply.

The scenario FIG. 7 may enable a particular low latency for transitioning between reception—e.g., of a WUS—by the wake-up receiver 1352 and reception by the main receiver 1351.

While in FIGS. 6 and 7 a scenario is illustrated where the main receiver 1351 and the low-power receiver 1352 share a common antenna, in other examples, it would be also possible that the interface 1011 includes dedicated antennas for the main receiver 1351 and the low-power receiver 1352.

While in the examples of FIGS. 6 and 7 scenarios are illustrated where there is a dedicated low-power receiver 1352, in other examples there may be no low-power receiver. Instead, the WUS may be received by the main receiver 1351 in a low-power state. For example, the main receiver 1351 may not be fit to receive data mapped to Quadrature Phase Shift Keying (QPSK), Binary Phase Shift Keying (BPSK), or Quadrature Amplitude Modulation (QAM) constellations. Rather, the main receiver 1351 may be fit to perform non-coherent decoding of a WUS, when operating in the low-power state. Then, in response to receiving the WUS, the main receiver 1351 may transition into a high-power state in which it is fit to receive the ordinary data, e.g., on channel 263, etc.

Figure 8:
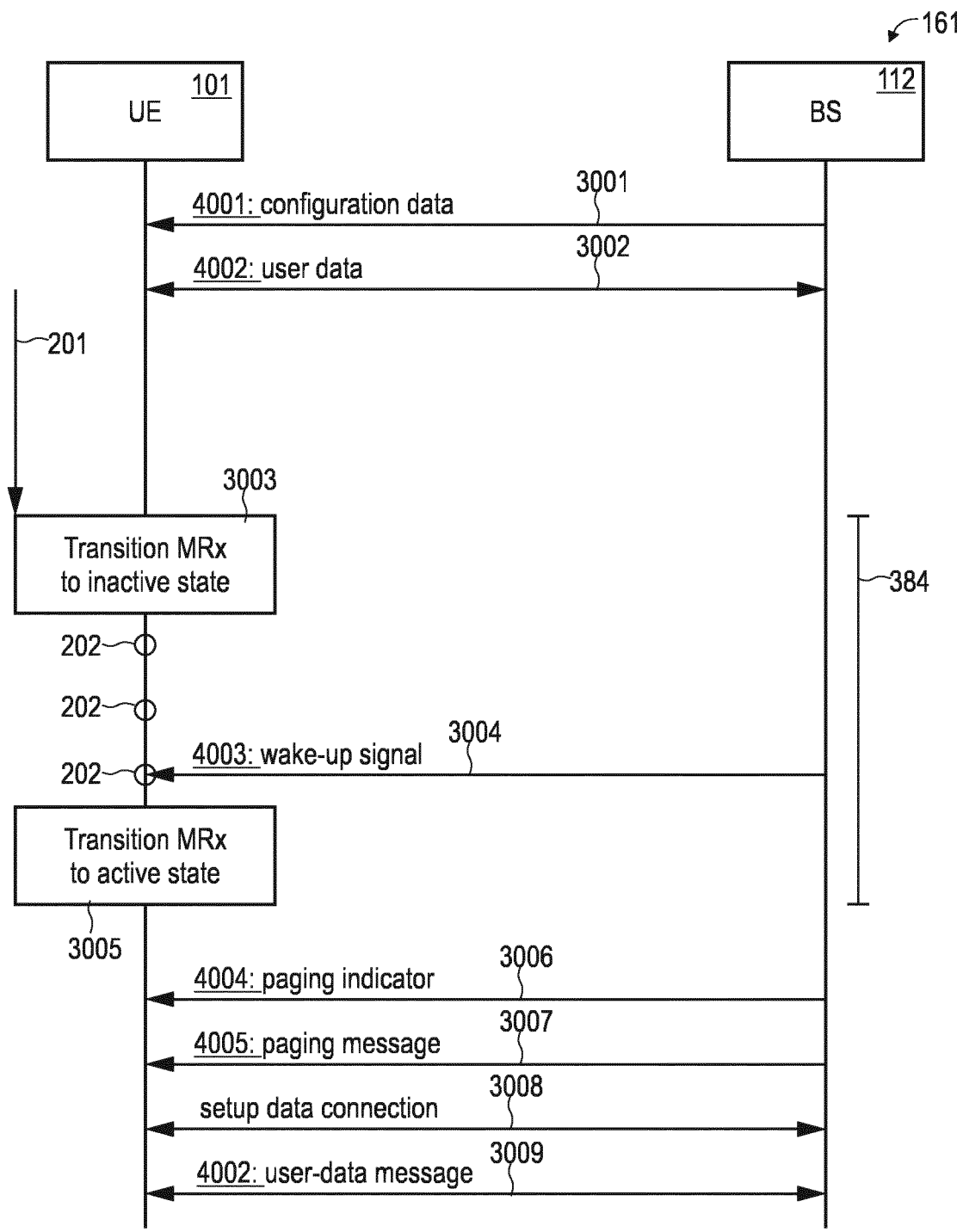
FIG. 8 schematically illustrates communication between a UE and a base station according to various examples.

FIG. 8 is a signaling diagram. FIG. 8 illustrates aspects with respect to communicating between the terminal 101 and the BS 112 (cf. FIG. 1).

FIG. 8 illustrates aspects with respect to transmitting and/or receiving (communicating) a WUS 4003. According to the various examples described herein, such techniques as described with respect to FIG. 8 may be employed for communicating WUSs 4003. In particular, FIG. 8 also illustrates aspects with respect to the inter-relationship between communication of the WUS 4003 and communication of a paging indicator 4004 and a paging message 4005.

At 3001, configuration data 4001 is communicated. This is generally optional. The configuration data 4001 is transmitted by the BS 112 and received by the terminal 101. For example, a respective control message may be communicated on the control channel 262, e.g., PDCCH. For example, the control message may be a Layer 2 or Layer 3 control message. The control data 4001 may be communicated using RRC/higher-layer signaling.

The configuration data 4001 may be indicative of a sequence design for the WUS transmission. The configuration data 4001 may be indicative of time-frequency resources used for the WUS transmission. The configuration data 4001 may be indicative of a schedule of the time frequency resources in an OFDM resource grid used for WUS transmission; i.e., the configuration data 4001 may allocate resource elements to the channel 261. The schedule may be indicative of a time pattern of the time-frequency resource elements and/or indicative of a frequency pattern of the time-frequency resource elements.

At 3002, a user data 4002 is communicated. For example, the user data 4002 may be communicated on the payload channel 263. For example, the user data 4002 may be communicated along the data connection 189, e.g., as part of a bearer, etc.

The configuration data 4001 and the user data 4002 are communicated using the main receiver 1351.

Then, there is no more data to be communicated between the terminal 101 and the BS 112. Transmit buffers are empty. This may trigger a timer. For example, the timer may be implemented at the terminal 101. After a certain timeout duration set in accordance with the inactivity schedule 201, the main receiver 1351 of the terminal 101 is transitioned into an inactive state 384 from an active state, 3003. This is done to reduce the power consumption of the terminal 101. For example, prior to the transitioning the main receiver 1351 to the inactive state 384, it would be possible to release the data connection 189 by appropriate control signaling (not illustrated in FIG. 8). The timeout duration 201 is an example implementation of a trigger criterion for transitioning into the inactive state 384; other trigger criteria are possible. For example, a connection release message may be communicated.

Multiple POs 202 for communicating the WUS 4003 are then implemented by reoccurring resource elements on the channel 261.

At some point in time, the BS 112 transmits a WUS 4003, 3004. This may be because there is DL data—e.g., payload data or control data—scheduled for transmission to the terminal 101 in a transmit buffer. Other wake-up events are possible, e.g., receiving a trigger message from the AMF 131.

In response to receiving the WUS 4003, the main receiver 1351 of the terminal 101 is transitioned to the active state, 3005.

Then, at 3006, a paging indicator 4004 is transmitted by the BS 112 to the terminal 101. The paging indicator 4004 is received by the main receiver 1351. For example, the paging indicator may be transmitted on channel 262, e.g. PDCCH. For example, the paging indicator may include a temporary or static identity of the terminal 101. The paging indicator 4004 may include information on a MCS used for communicating a paging message 4005 at 3007. The paging message 4005 may be communicated on a shared channel 263, e.g., physical downlink shared channel (PDSCH).

Then, at 3008, a data connection 189 is set up between the terminal 101 and the BS 112. This may include a random access procedure.

Finally, a UL or DL user-data message 4002 is communicated using the newly set up data connection 189 at 3009.

As will be appreciated from FIG. 8, upon transitioning the main receiver 1351 to the active state at 3005, the data connection 189 needs to be re-established. For this reason, the terminal 101 operates in idle mode—when no data connection 189 is set up or maintained—while the inactive state 384 of the main receiver 1351 is active. However, in the various examples described herein, other implementations of the particular mode in which the terminal 101 operates while the inactive state 384 is active are conceivable. For example, the terminal 101 may operate in connected mode while the inactive state 384 is active.

Figure 9:
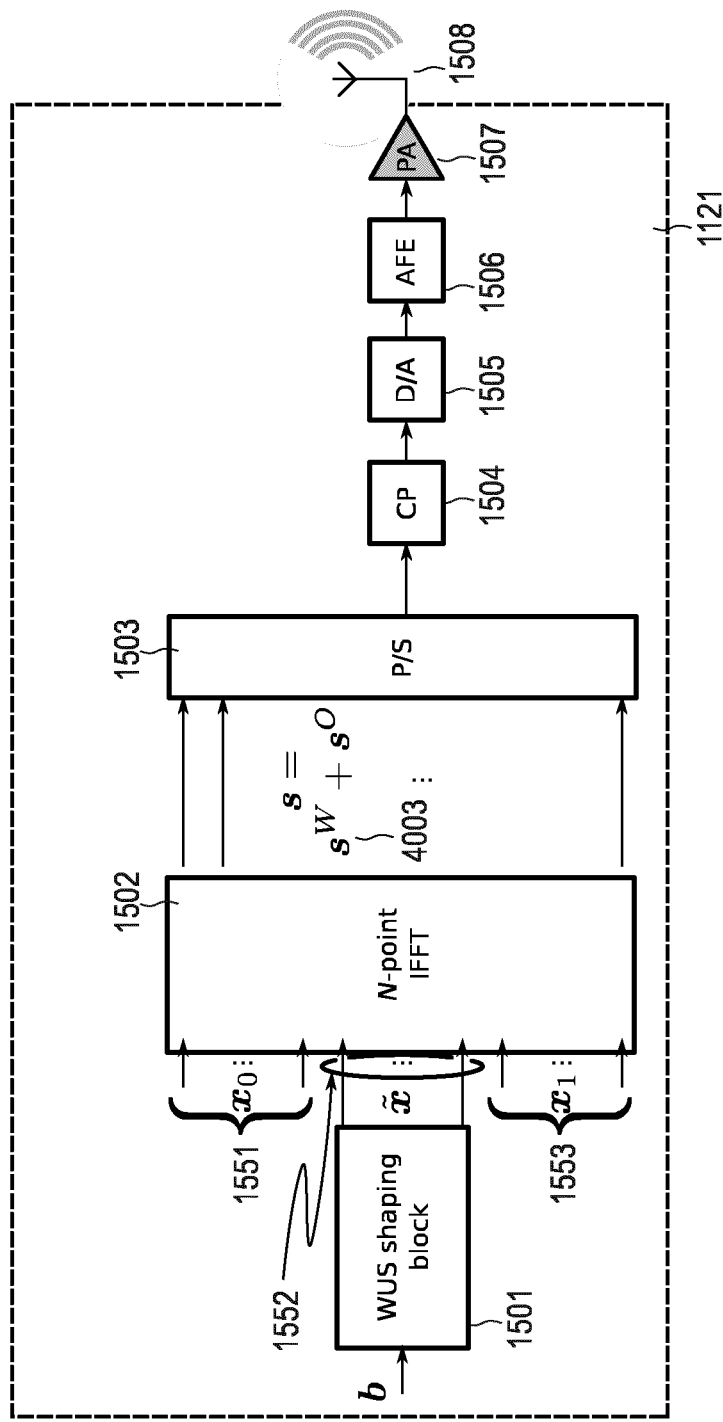
FIG. 9 schematically illustrates a wireless interface and an antenna according to various examples.

FIG. 9 illustrates aspects with respect to the wireless interface 1121 of the BS 112. FIG. 9 illustrates aspects with respect to transmitting the WUS 4003.

The interface 1121 includes a WUS signal-shaping block 1501; an IFFT block 1502; a parallel-to-serial block 1503; a cyclic prefix block 1504; a digital-to-analog converter 1505; an analog frontend 1506; and a power amplifier 1507. The interface 1121 is coupled to one or more antennas 1508.

A reference WUS waveform b is input to the WUS signal-shaping block 1501. As a general rule, the reference WUS waveform b can be defined in accordance with a non-coherent modulation scheme, e.g., OOK, Frequency-shift keying (FSK). Hence, information encoded by the reference WUS waveform b can be mapped to a constellation of a non-coherent modulation scheme. Other modulation schemes that facilitate reduced power consumption at the low-power receiver are conceivable.

Non-coherent modulation schemes generally do not require a receiver clock to be in-phase, i.e., synchronized with the transmitter, specifically, the carrier signal of the transmitter. In this case, modulation symbols (rather than bits, characters, or data packets) are asynchronously transferred.

As a general rule, the term "waveform" is used herein to the baseband representation of a signal—i.e., not modulated onto a respective carrier and subcarrier. For example, a waveform may be obtained by encoding a bit stream. Interleaving can be applied. Then, to obtain the waveform mapping onto the constellation of the respective modulation can be applied, e.g., a mapping onto the OOK constellation, etc.

The WUS signal-shaping block 1501 shapes the reference WUS waveform b. This shaping is done to facilitate, both, (i) OFDM modulation, as well as (ii) use of a non-coherent low-power receiver at the receiver (not illustrated in FIG. 9).

The reference WUS waveform b is shaped to obtain multiple WUS waveforms x̃. The various WUS waveforms x̃ are associated with the WUS subcarriers reserved for the WUS channel 261. The multiple WUS waveforms x̃ corresponds to a frequency-domain representation of the reference WUS waveform b. The multiple WUS waveforms x̃ are input into respective channels 1552 of the IFFT block 1502.

Generally, the IFFT block 1502 provides modulation of signal waveforms onto various subcarriers. The OFDM modulation facilitated by the IFFT block 1502 enables FDD: Further channels 1551, 1553 of the IFFT block 1502 are used to communicate on other channels 262, 263, e.g., with other terminals. A plurality of data signal waveforms $x_0$, $x_1$—associated with subcarriers different from the WUS subcarriers—are obtained. The data signal waveforms $x_0$, $x_1$ are defined in accordance with a coherent modulation scheme, e.g., QPSK, BPSK, or QAM. The data signal waveforms $x_0$, $x_1$ are then input to the channels 1551, 1553 of the IFFT block 1502 (also cf. FIG. 10, where details of the IFFT block 1502 are shown).

Figure 10:
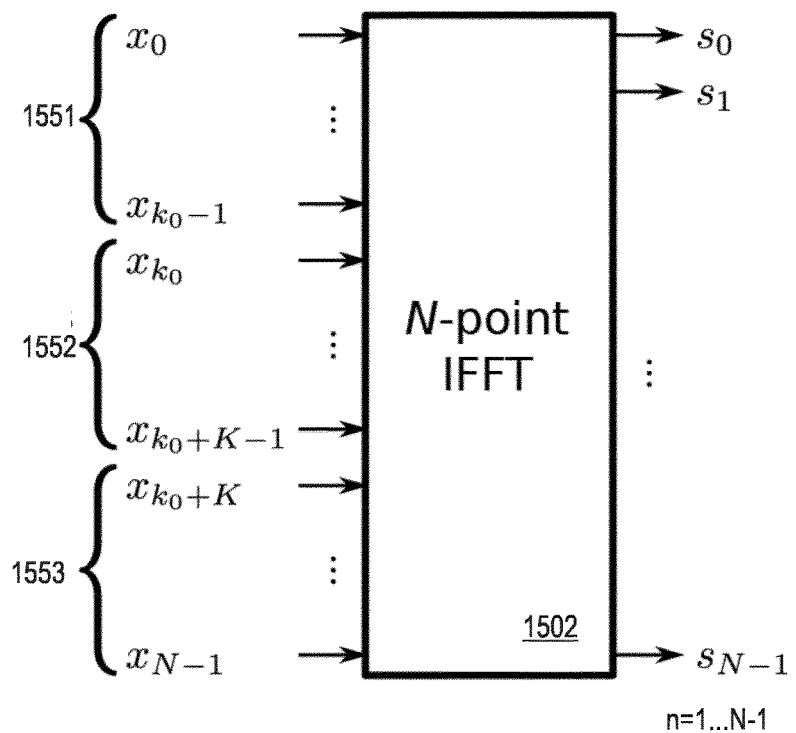
FIG. 10 schematically illustrates details of the wireless interface of FIG. 9 according to various examples.

In accordance with FIGS. 9 and 10, a vector representation of the data input to the IFFT block 1502 is as follows:

$$x = \begin{bmatrix} x_0 \\ \vdots \\ x_{k_0-1} \\ -- \\ x_{k_0} \\ \vdots \\ x_{k_0+K-1} \\ -- \\ x_{k_0+K} \\ \vdots \\ x_{N-1} \end{bmatrix} = \begin{bmatrix} x_0 \\ -- \\ \tilde{x} \\ -- \\ x_1 \end{bmatrix} \quad (1)$$

In Eq. (1), $$x_0 = \begin{bmatrix} x_0 \\ \vdots \\ x_{k_0-1} \end{bmatrix} \quad (2)$$

$$x_1 = \begin{bmatrix} x_{k_0+K} \\ \vdots \\ x_{N-1} \end{bmatrix}$$

denotes the data signal waveforms and $$\tilde{x} = \begin{bmatrix} x_{k_0} \\ \vdots \\ x_{k_0+K-1} \end{bmatrix} \quad (3)$$

denotes the WUS waveform. K denotes the set of sub-carriers associated with the wake-up signal waveform x̃, i.e., $\{k_0, \ldots, k_0+K-1\}$. The center sub-carrier of K is $k_c$.

The IFFT block 1502 transforms from frequency domain to time domain. An output of the IFFT block 1502 corresponds to a set of complex time-domain samples representing the OFDM subcarrier signals.

The operation of the IFFT block 1502 can be represented in time domain as follows:

$$s_n = \frac{1}{N}\sum_{k=0}^{N-1} x_k e^{j2\pi\frac{kn}{N}} = \underbrace{\frac{1}{N}\sum_{k\in\mathcal{K}} x_k e^{j2\pi\frac{kn}{N}}}_{\text{On WUS subcarriers: } s_n^W} + \quad (4)$$

$$\underbrace{\frac{1}{N}\sum_{k\notin\mathcal{K}} x_k e^{j2\pi\frac{kn}{N}}}_{\text{On other subcarriers: } s_n^O}$$

$$= e^{j2\pi\frac{k_c n}{N}}\underbrace{\frac{1}{N}\sum_{k\in\mathcal{K}} x_k e^{j2\pi\frac{(k-k_c)n}{N}}}_{\text{Baseband WUS } \tilde{b}_n} +$$

$$\frac{1}{N}\sum_{k\notin\mathcal{K}} x_k e^{j2\pi\frac{kn}{N}}$$

$$= e^{j2\pi\frac{k_c n}{N}}\tilde{b}_n + s_n^O$$

$$= s_n^W + s_n^O$$

The baseband representation of the WUS $s_n^W$ is denoted $\tilde{b}_n$. Here, "baseband" refers to the signal before modulation onto the sub-carriers. Here, n is the index of the various output channels of the IFFT block 1502.

The IFFT block can be described by a linear transformation function F; Eq. (4) can be re-written in matrix notation:

$$s = \begin{bmatrix} s_0 \\ \vdots \\ s_{N-1} \end{bmatrix} = \tag{5}$$

$$IFFT_N(x) = Fx = F\begin{bmatrix} 0 \\ \tilde{x} \\ 0 \end{bmatrix} + F\begin{bmatrix} x_0 \\ 0 \\ x_1 \end{bmatrix} = \begin{bmatrix} s_0^W \\ \vdots \\ s_{N-1}^W \end{bmatrix} + \begin{bmatrix} s_0^O \\ \vdots \\ s_{N-1}^O \end{bmatrix} = s^W + s^O$$

$$F = \frac{1}{N}\begin{bmatrix} 1 & 1 & 1 & \cdots & 1 \\ 1 & \omega & \omega^2 & \cdots & \omega^{N-1} \\ 1 & \omega^2 & \omega^4 & \cdots & \omega^{(N-1)2} \\ \vdots & \vdots & \vdots & \ddots & \vdots \\ 1 & \omega^{N-1} & \omega^{2(N-1)} & \cdots & \omega^{(N-1)(N-1)} \end{bmatrix} \text{ for } \omega = e^{j\frac{2\pi}{N}}$$

In block 1503, the samples are clocked out to provide the OFDM symbol s of a certain duration. A guard interval—implemented by a cyclic prefix—is added by the CP block 1504, which increases the length of the OFDM symbol. Hence, blocks 1502, 1503, 1504 implement an OFDM modulator as they output a baseband OFDM symbol of a certain duration.

Then, the blocks 1505-1507 are controlled to transform the OFDM symbol into analog domain, modulate it onto the carrier, amplify it, and transmit it on the spectrum.

FIG. 9 illustrates that the baseband OFDM symbol s includes two contributions, i.e., (i) the contribution from the WUS $s^W$ (the WUS part of the OFDM symbol) and (ii) the contribution from the data signal $s^O$. $s^W$ is the WUS part of the OFDM symbol s modulated on the WUS subcarriers associated with the channels 1552; and $s^O$ is the part of the OFDM symbol $s^O$ modulated on the subcarriers associated with the channels 1551, 1553:

$$s = s^W + s^O \tag{6}$$

$$= \begin{bmatrix} \omega^{k_c 0}\tilde{b}_0 \\ \vdots \\ \omega^{k_c(N-1)}\tilde{b}_{N-1} \end{bmatrix} + \begin{bmatrix} s_0^O \\ \vdots \\ s_{N-1}^O \end{bmatrix}$$

$$= \text{diag}(\omega^{k_c 0}, \ldots, \omega^{k_c(N-1)})\tilde{b} + s^O.$$

The WUS part $s^W$ of the OFDM symbol s corresponds to the WUS 4003.

In FIG. 9, the signal shaping block 1501 is configured to shape the reference WUS waveform b such that the baseband representation of the WUS part $s^W$ of the OFDM symbol s, i.e., $\tilde{b}$, is approximately equal to b. Such an approach allows for orthogonality between waveforms $x_0$, $x_1$ and $\tilde{x}$ when included in the same OFDM symbol s. This is achieved by communicating the WUS 4003, $s^W$ as an OFDM-based modulated signal. The signal shaping block 1501 calculates the necessary input $\tilde{x}$ to the IFFT block 1502 on the subcarriers 301-302 designated for the WUS 4001 which is needed to approximate a desired reference WUS waveform b in the time domain. Thereby, the WUS part $s^W$ of the resulting OFDM symbol s can be detected by a low-power receiver without the need for further synchronization, while still being orthogonal to the other parts $s^O$ of the OFDM signal s.

This gives the flexibility to design the reference WUS waveform b such that if it was directly received by the low-power receiver, it would appropriately wake-up the terminal 101. For example, the reference WUS waveform b can be designed to be terminal specific. For example, the reference WUS waveform b can be designed to be cell specific. For example, the reference WUS waveform b can be designed to have a variable length, e.g., depending on the coverage situation of the terminal 101. For example, the reference WUS waveform b can be designed to have a specific base sequence, e.g., to facilitate code division multiple access (CDMA) for multiple UEs.

As a general rule, various options are available to implement the signal shaping of the signal shaping block 1501. Generally, a numerical calculation—e.g. an optimization —, or an analytical calculation (i.e., direct calculation) may be used to implement the signal shaping.

For example, an optimization may be implemented. For this, a feedback path may be implemented that provides a feedback of $\hat{b}$ to the signal shaping block 1501. Then, an iterative optimization algorithm may be employed that—e.g., in a numerical simulation—varies the output of the signal shaping block 1501, i.e., $\tilde{x}$, until an optimization criterion is met; the optimization criterion can correspond to a difference between the reference WUS waveform b and $\hat{b}$. In a further example, the shaping can be based on an analytic approximation of the OFDM modulator 1502-1504 or OFDM modulator. For example, it would be possible that the shaping is based on an approximation of the IFFT block 1502. The approximation of the IFFT block 1502 can be denoted $\tilde{F}$. Here, $\tilde{F}$ can be a sub-matrix of F. The dimension of F can be N×K, see Eqs. (1)-(4). For example, it would be possible to select the WUS-subcarriers K symmetrically around the center subcarrier $k_c$. Thereby, the output of the IFFT block 1502 can be approximated, but orthogonality to the data signal waveforms is maintained. Thus, receiver performance of the OFDM receiver is persevered: the shaping can be based on an approximation of an OFDM demodulator, which transforms the reference waveform (b) from time to frequency domain (cf. FIG. 13). In a further example option, an analytical calculation may be implemented in connection with the shaping. Thus, based on the signal shape and timing of the reference WUS waveform b, the WUS waveforms $\tilde{x}$ can be calculated. For example, the analytical calculation may not be constrained by a limited result space of possible WUS waveforms $\tilde{x}$, e.g., a discrete and finite set of candidate WUS waveforms $\tilde{x}$ that would be obtained in a look-up table/codebook-based approach. Rather, variable results may be obtained, based on the calculation.

Such a calculation as part of the signal shaping has various advantages, e.g., if compared to reference implementations that use a look-up table to select the appropriate signal waveforms $\tilde{x}$: to give an example, where a predefined look-up table is used, the flexibility in approximating arbitrary reference WUS waveforms b can be strongly limited. For example, the timing references of the coherent modulation scheme and the OFDM modulation may be different. I.e., a start time of the reference WUS waveform b may not be aligned with a start time of an OFDM symbol. Then, there can be timing shifts between the individual symbols of the reference WUS waveform b and the beginning of the OFDM symbol. It is difficult or even impossible to accommodate for such arbitrary timing shifts by using a look-up table.

Specifically, it would be possible that the signal shaping at the signal-shaping block 1501 minimizes a difference between $\tilde{x}$ and b. As a general rule, various metrics can be considered to define the difference. An example metric is the least-squares metric, i.e.:

$$\min_{\tilde{x}} \|\tilde{F}\tilde{x} - \tilde{b}\|^2 \tag{7}$$

Eq. 7 can be reformulated as:

$$\tilde{x}_{LS}=(\tilde{F}^H\tilde{F})^{-1}\tilde{F}^H\tilde{b}, \quad (8)$$

where $\tilde{x}_{LS}$ denotes the WUS waveform $\tilde{x}$ as obtained from the least-squares metrics approximation.

As a general rule, while FIG. 9 illustrates transmission of (i) a WUS by (ii) a BS, generally it would be possible to transmit (i) another type of signal by (ii) another device using the techniques described in FIG. 9.

Figure 11:
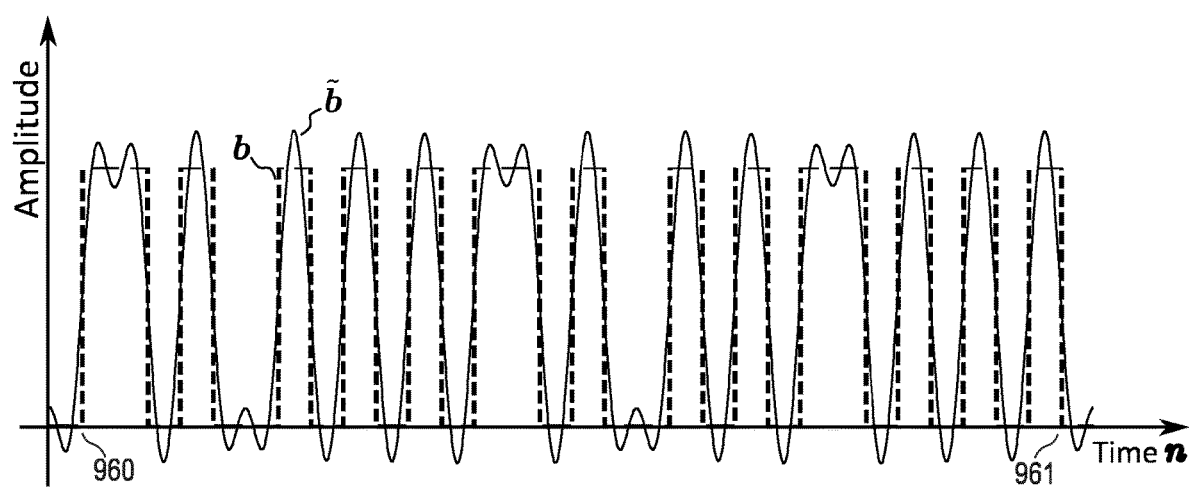
FIG. 11 schematically illustrates WUS waveforms according to various examples.

FIG. 11 illustrates aspects with respect to such a signal shaping using Eq. 8. In FIG. 11, the dashed line illustrates the reference WUS waveform b and the full line illustrates the baseband representation b of the WUS part $s^W$ of the OFDM symbols. As illustrated in FIG. 11, $\tilde{b} \approx b$.

FIG. 11 is provided for b being mapped to symbols of OOK, using an N=2048 IFFT OFDM system and carrying the WUS on K=64 consecutive subcarriers (out of 72 designated ones). The signals are shown for one full OFDM symbol (2048 time samples) without the cyclic prefix.

As a general rule, it is not required that a timing of the reference WUS waveform b is aligned with a timing of OFDM symbols. In other words, a start time 960 of the reference WUS waveform b and/or a stop time 961 of the reference WUS waveform b (and, accordingly of the baseband representation b of the WUS part $s^W$ of the OFDM symbol s) need not to be synchronized with the start time and the stop time of the OFDM symbol; timing shifts can exist.

Figure 12:
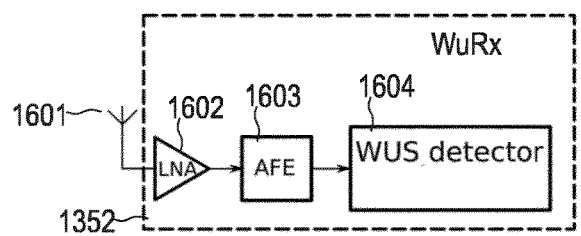
FIG. 12 schematically illustrates a low-power receiver according to various examples.

This facilitates employing a low-power receiver 1352 for receiving the WUS part $s^W$ of the OFDM symbol s, cf. FIG. 12.

FIG. 12 illustrates aspects with respect to the low-power receiver 1352. The low-power receiver 1352 is coupled to an antenna 1601. The low-power receiver 1352 may include a bandpass filter that restricts the receive bandwidth to the subcarriers 301-303 for WUS transmission (not illustrated in FIG. 12). The low-power receiver 1352 includes an analog frontend that may perform demodulation from the carrier. A non-coherent WUS detector 1604 is provided which is configured to demodulate the respective waveform in accordance with the non-coherent modulation scheme associated with the reference WUS waveform b. For the non-coherent demodulation, a SS needs not to be received first. Rather, time-domain processing in accordance with OOK-demodulation or FSK-demodulation reference implementations is possible. The transmitter of the OFDM symbol and the receiver of the OFDM symbol need to be synchronized.

FIG. 12 shows an example implementation of the demodulation at the low-power receiver 1352. Other implementations are possible.

Figure 13:
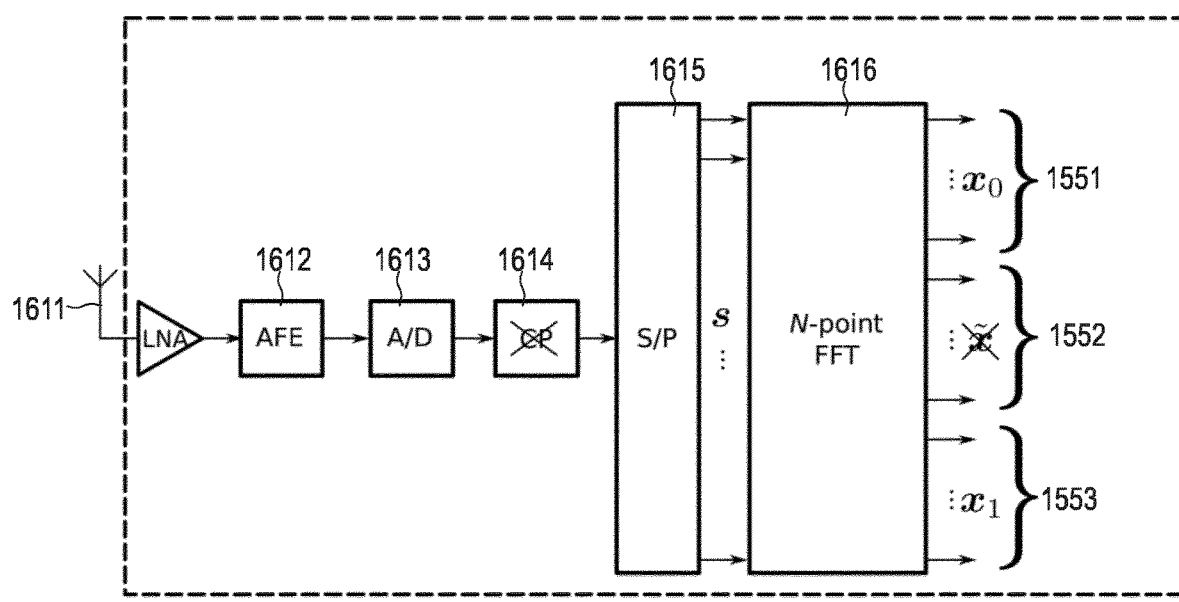
FIG. 13 schematically illustrates a main receiver according to various examples.

FIG. 13 illustrates aspects with respect to the main receiver 1351. The main receiver 1351 is coupled to an antenna 1611. The main receiver 1351 includes a low noise amplifier 1612, an analog-to-digital converter 1613, a cyclic prefix removal block 1614, a serial-to-parallel conversion 1615, and an FFT block 1616. The FFT block 1616 outputs multiple channels 1551-1552. The channels 1552 include the WUS waveform which, however, can be discarded, because the main receiver 1351 is already in active state. The blocks 1614-1616 hence form an OFDM de-modulator.

As a general rule, the low-power receiver 1352 of FIG. 12 and the main receiver 1351 of FIG. 13 may be integrated into the same device, e.g., into the UE 101. In such an implementation, it is possible that the main receiver 1351 and the low-power receiver 1352 re-use the same antenna. The low-power receiver 1352 and the main receiver 1351 can be individually activated and deactivated, e.g., depending on the operational mode of the UE 101.

Figure 14:
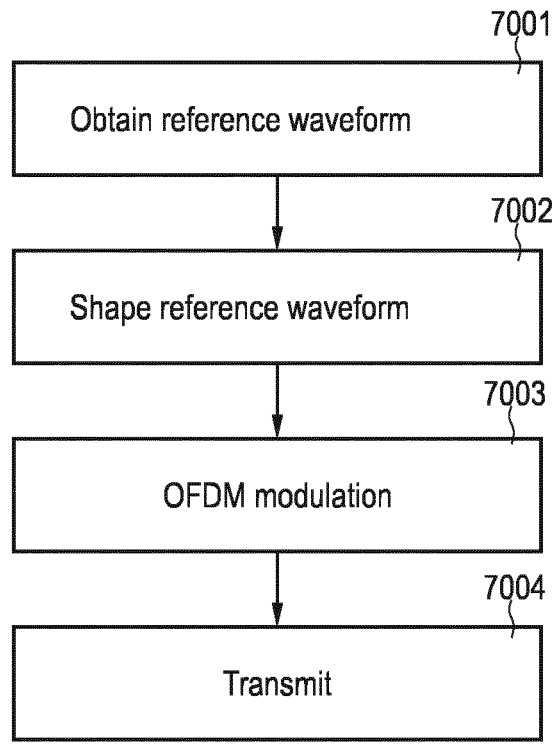
FIG. 14 is a flowchart of a method according to various examples.

FIG. 14 is a flowchart of a method according to various examples. In FIG. 14, blocks 7001-7004 may be performed by a transmitter, e.g., implemented by the wireless interface 1121 of the BS 112 (cf. FIG. 9) or implemented by a wireless interface of another device, e.g., the UE 101.

At block 7001, a reference waveform is obtained, e.g., a reference WUS waveform. The reference waveform can be in accordance with a non-coherent modulation scheme, i.e., mapped to the constellation of, e.g., OOK, etc. Hence, if the reference waveform was received by a low-power receiver, it could be decoded by the low-power receiver and could trigger activation of the main receiver. For example, the reference waveform may be obtained in-response to a wake-up event, e.g., a respective control message from the AMF 131.

Next, at block 7002, the reference waveform is signal shaped. For example, Eq. (8) could be used. The signal shaping changes the reference waveform and one or more waveforms associated with one or more selected subcarriers of an OFDM modulation are obtained by the signal shaping. The signal shaping can be based on an approximation of a transformation function of the OFDM modulation. The signal shaping can be configured to minimize a difference between (i) a baseband representation of a part of the OFDM symbol on the selected subcarriers and (ii) the reference waveform.

By implementing the shaping at the transmitter, real-time processing is possible. I.e., it would be possible to dynamically react to different reference waveforms being obtained, or even different timings of reference waveforms (e.g., different time shifts between the start time of the reference waveform and the start time of an OFDM symbol). This provides for increased flexibility if compared to reference implementations in which a predefined look-up table is used that has been pre-generated offline.

Block 7003 corresponds to OFDM modulation. It is possible to consider further data signal waveforms on other subcarriers.

At block 7004, the OFDM symbol obtained from the OFDM modulation of block 7003 is transmitted.

Figure 15:
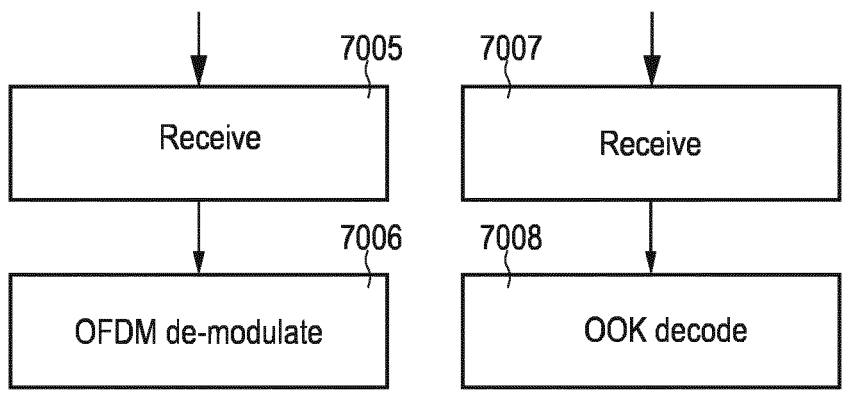
FIG. 15 is a flowchart of a method according to various examples.

FIG. 15 is a flowchart of a method according to various examples. In FIG. 15, blocks 7005 and 7006 may be implemented by a receiver, e.g., the main receiver 1351 of the wireless interface 1011 of the terminal 101. Blocks 7007 and 7008 may be implemented by a receiver, e.g., the low-power receiver 1352 of the wireless interface 1011 of the terminal 101.

The method of FIG. 15 is inter-related with the method of FIG. 14. The method of FIG. 15 may be used to receive the OFDM symbol transmitted at block 7004.

Block 7005 corresponds to operation of the main receiver, if activated. Here, the OFDM symbol is received across the entire carrier bandwidth, i.e., including all subcarriers, block 7005. Then, OFDM demodulation is applied, block 7006. This may include receiving a SS and synchronization with the transmitter.

Block 7007 corresponds to operation of the low-power receiver, e.g., if the main receiver is in inactive state. Here, reception of the OFDM symbol, at block 7007, is restricted to the bandwidth of the selected subcarriers encoding the waveform, e.g., by employing a bandpass filter. Then, at block 7008, OOK decoding—or, generally, another non-coherent decoding—is applied.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various examples have been described with respect to communicating WUS. However, the particular type of the signal—i.e., the action it triggers at the receiver—is not germane for the functioning of the techniques described herein. In other examples, other kinds and types of signals may be communicated.

For further illustration, above, various examples have been described in which a WUS is transmitted by a BS. In other examples, a WUS may be transmitted by devices other than a BS. For example, it would be possible to transmit a WUS—or another signal, as explained above—by a UE, e.g., on a sidelink channel or, generally, using peer-to-peer communication.

For still further illustration, various examples have been described in which a non-coherent demodulation is used at the low-power receiver 1352. In other examples, other modulation schemes may be used for the reference signal waveform—in particular, such modulation schemes that facilitate reducing the power consumption at the low-power receiver. This means that transmitted waveforms should have properties that allow them to be received without power consuming synchronization to the transmitter (neither in time or frequency). Further, the waveforms should also have the property that they can be received without (or with as few as possible) power-consuming components like mixers, ADCs, OFDM processing/FFTs, etc.

The invention claimed is:

1. A method for a wireless communication network, comprising:
    at a wireless interface of a base station:
        obtaining a reference signal waveform which is defined in accordance with a modulation scheme,
        shaping the reference signal waveform by calculation, to obtain at least one signal waveform associated with one or more subcarriers of a plurality of subcarriers,
        in response to said shaping: inputting the at least one signal waveform to at least one corresponding channel of a multi-channel orthogonal frequency division multiplex (OFDM) modulator, and
        transmitting an OFDM symbol output by the OFDM modulator,
    wherein said shaping approximates a baseband representation of a part of the OFDM symbol associated with the one or more subcarriers to the reference signal waveform.

2. The method of claim 1,
wherein the calculation comprises an iterative optimization.

3. The method of claim 1,
wherein said shaping is based on an approximation of the OFDM modulator or an approximation of an OFDM demodulator.

4. The method of claim 1,
wherein said shaping minimizes a time-domain difference between the baseband representation of the part of the OFDM symbol on the one or more subcarriers and the reference signal waveform.

5. The method of claim 1,
wherein the calculation comprises an analytical calculation.

6. The method of claim 1, further comprising:
at the wireless interface of the base station:
    obtaining a plurality of data signal waveforms associated with further subcarriers of the plurality of subcarriers, the further subcarriers being different from the one or more subcarriers, the plurality of data signal waveforms being defined in accordance with a coherent modulation scheme, and
    inputting the plurality of data signal waveforms to corresponding channels of the OFDM modulator.

7. The method of claim 6,
wherein the coherent modulation scheme is selected from the group comprising: BPSK; QPSK; and QAM.

8. The method of claim 1,
wherein the modulation scheme is a non-coherent modulation scheme which comprises On-Off-Keying.

9. The method of claim 1,
wherein the signal waveform is a wake-up signal waveform,
wherein the reference signal waveform is obtained and shaped in response to a wake-up event associated with a wireless communication device.

10. The method of claim 1, further comprising:
at a wireless communication device:
    receiving the OFDM symbol,
    applying a bandpass filter to the received OFDM symbol, the bandpass filter being aligned with the one or more subcarriers, and
    demodulating the bandpass filtered received OFDM symbol based on the modulation scheme.

11. The method of claim 10,
wherein said demodulating of the bandpass filtered received OFDM symbol is based on time-domain processing.

12. The method of claim 1, further comprising:
at the wireless communication device:
    controlling a main receiver to receive the OFDM symbol, and
    demodulating the received OFDM symbol by inputting the received OFDM symbol into an OFDM demodulator.

13. A device, comprising:
a wireless interface having a shaping component, an OFDM modulator, inverse fast Fourier transform component, and an analog frontend,
wherein the wireless interface is configured to:
    obtain a reference signal waveform which is defined in accordance with a modulation scheme,
    shape the reference signal waveform by calculation, to obtain at least one signal waveform associated with one or more subcarriers of a plurality of subcarriers,
    in response to said shaping: input the at least one signal waveform to at least one corresponding channel of a multi-channel orthogonal frequency division multiplex, OFDM, modulator, and
    transmit an OFDM symbol output by the OFDM modulator,
wherein said shaping approximates a baseband representation of a part of the OFDM symbol associated with the one or more subcarriers to the reference signal waveform.

* * * * *